(12) United States Patent
Ge et al.

(10) Patent No.: US 7,706,256 B2
(45) Date of Patent: Apr. 27, 2010

(54) PROTECTION SWITCHING METHOD AND APPARATUS FOR NODES IN A RESILIENT PACKET RING NETWORK

(75) Inventors: Xiang Ge, Shenzhen (CN); Fan Zhang, Shenzhen (CN); Shaohua Wang, Shenzhen (CN); Pengju Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 669 days.

(21) Appl. No.: 11/560,688

(22) Filed: Nov. 16, 2006

(65) Prior Publication Data

US 2007/0115805 A1 May 24, 2007

Related U.S. Application Data

(63) Continuation of application No. PCT/CN2005/001844, filed on Nov. 4, 2005.

(30) Foreign Application Priority Data

Nov. 4, 2004 (CN) .................. 2004 1 0090299

(51) Int. Cl.
*H04J 1/16* (2006.01)
(52) U.S. Cl. ..................................... 370/222
(58) Field of Classification Search ............... 370/222, 370/223, 224, 225, 227, 228, 248, 249, 242, 370/244, 247, 250, 252, 258
See application file for complete search history.

(56) References Cited

U.S. PATENT DOCUMENTS 4,266,293 A * 5/1981 Anderson et al. ........... 370/228

(Continued)

FOREIGN PATENT DOCUMENTS

CA          2392942  A1    1/2003

(Continued)

OTHER PUBLICATIONS

IEEE Computer Society, IEEE Draft Standard P802.17/D3.0a, "Resilient packet ring (RPR) access method and physical layer specifications" (Feb. 10, 2004).

(Continued)

*Primary Examiner*—Chi H Pham
*Assistant Examiner*—Alexander Boakye
(74) *Attorney, Agent, or Firm*—Leydig, Voit & Mayer, Ltd.

(57) ABSTRACT

The present invention discloses a protection switching apparatus for nodes in a Resilient Packet Ring (RPR) network, including: a first switching module, for receiving inner ringlet data and transmitting data to the outer ringlet; a second switching module, for receiving outer ringlet data and transmitting data to the inner ringlet; and when it is in a normal mode, each of the switching modules transmits the received ringlet data to the other switching module connected to itself, and the received ringlet data are transmitted through normal data paths; when protection switching is required and frame boundaries of data are reached, the first and second switching modules directly switch data paths within themselves, and transmit the received ringlet data through WRAP data paths. At the same time, a protection switching method for nodes in an RPR network is provided. This invention is easy to realize, and data path switching is performed at frame boundaries of data transmission, thus no packet will be lost and reliability of RPR network nodes is guaranteed.

14 Claims, 7 Drawing Sheets

U.S. PATENT DOCUMENTS

| | | | |
|---|---|---|---|
| 5,469,428 | A | 11/1995 | Tokura et al. |
| 5,757,768 | A | 5/1998 | Goto et al. |
| 6,594,232 | B1 * | 7/2003 | Dupont ................. 370/224 |

FOREIGN PATENT DOCUMENTS

| | | |
|---|---|---|
| CN | 1395382 A | 2/2003 |
| CN | 1466280 A | 1/2004 |
| CN | 1479455 A | 3/2004 |
| WO | WO 00/74318 A1 | 12/2000 |

OTHER PUBLICATIONS

IEEE Computer Society, IEEE Draft Standard P802.17/D3.3, "Resilient packet ring (RPR) access method and physical layer specifications" (Apr. 21, 2004).

IEEE Computer Society, IEEE Standard 802.17, "Resilient packet ring (RPR) access method and physical layer specifications" (Sep. 24, 2004).

* cited by examiner

PROTECTION SWITCHING METHOD AND APPARATUS FOR NODES IN A RESILIENT PACKET RING NETWORK

This application is a continuation of International Patent Application No. PCT/CN2005/001844, filed Nov. 4, 2005, which claims priority to Chinese Patent Application No. 200410090299.0, filed Nov. 4, 2004, all of which are hereby incorporated by reference.

FIELD OF THE INVENTION

The present invention relates to Resilient Packet Ring (RPR) networks, and more particularly, to a protection switching method and apparatus for nodes in an RPR network.

BACKGROUND OF THE INVENTION

Resilient Packet Ring, hereinafter referred to as RPR, is a new technique of Medium Access Control (MAC) layer, which is being standardized by IEEE802.17 workgroup. This new layer 2 link technique can perform service transmission based on any kind of physical layers, such as Ethernet, Synchronous Digital Hierarchy/Synchronous Optical Network (SDH/SONET), Dense Wavelength Division Multiplexing (DWDM) and so on. The RPR technique is used to construct a metropolitan area network centered on data on the basis of ring topology, and it can provide data-optimized bandwidth management and solution for highly cost-effective multi-service transport, as well as provide a relatively sophisticated protection switching mechanism. As shown in FIG. 1, a dual-fiber structure is adopted by the RPR network, and each fiber can transmit both data services and control information. An RPR node is composed of one physical layer entity and one MAC sub-layer entity. A MAC layer client may transmit data services by one ringlet, and transmit control information by the other ringlet. In this way, data can be transported upon two fibers at the same time by the RPR technique, thus it can accelerate transmission of control information, and realize bandwidth adaptation and fast self-cure.

Compared with the prior art, the RPR technique provides many advantages, e.g., the RPR can increase bandwidth utilization ratio, equally allocate bandwidths among nodes, as well as support plug and play, and various priority services.

The resiliency of RPR means the ability to implement protection switching, i.e., services can be automatically protected by switching within 50 ms when a fault occurs in a closed-ring and be recovered when the fault is gone. There are two protection switching modes defined in the RPR protocol, one is a Steering mode based on a new topology structure, and the other is a Wrapping mode which requires two nodes on both sides of a fault to carry out switching. The Steering mode is a default protection approach of the RPR network, which is supported by all nodes in the network according to protocols. That is, the Steering mode is mandatory, while the Wrapping mode is optional. It is well known by those skilled in the art that trigger conditions of protection switching include line invalidation, node invalidation, service degradation, imperative switching, and so on.

As shown in FIG. 2, for the Steering mode, Station1 ... Station6 represent 6 network nodes, the inner ringlet and the outer ringlet of RPR are expressed as Inner Ringlet and Outer Ringlet respectively, the fault between Station5 and Station6 is denoted as Fiber Cut (FC), and the dotted line in FIG. 2 denotes transmission path of outer ringlet data after switching. When the network detects a fault, wrapping protection may not be carried out at the two nodes adjacent to the fault, and topology search is performed at once, thus route is optimized according to a new topology structure. Then, the source node may directly transmit data to the destination node according to the new topology path. Namely, if the path between Station5 and Station6 is broken down, the information is broadcast in the RPR network. Then, the source node Station4 will change to inner ringlet to transmit data after receiving this information, and the data will be sent to the destination node Station1 via Station3 and Station 2. During the procedure, a small portion of data already sent out from the source node will be discarded at the fault node.

As shown in FIG. 3, for the Wrapping mode, Station1 ... Station6 represent 6 network nodes, the inner ringlet and the outer ringlet of RPR are expressed as Inner Ringlet and Outer Ringlet respectively, the fault between Station5 and Station6 is denoted as Fiber Cut (FC), and the dotted line in FIG. 3 denotes transmission path of outer ringlet data after switching. When a node detects a fault initiating the switching, adjacent nodes of the fault will be switched, and protection information will be broadcast to other nodes in the RPR network. Then, data will be sent to the destination node through a switched path of the node, that is, data stream from outer ringlet enters inner ringlet at Station5, and continues to be transmitted after circling the inner ringlet once.

Although the Wrapping mode forwarded by IEEE802.17 workgroup is a fast way without data loss, there is not any specific technical scheme to implement Wrapping mode yet. Therefore, a method is needed to implement Wrapping mode in an RPR network.

SUMMARY

Exemplary embodiments of the present invention are to provide a protection switching method for nodes in a Resilient Packet Ring (RPR) network, so as to implement simple and reliable protection switching based on a Wrapping mode for nodes.

Furthermore, the present invention is to provide a protection switching apparatus for nodes in a Resilient Packet Ring (RPR) network, so as to implement the above-mentioned method.

Technical schemes of the present invention are implemented as follows:

A protection switching method for nodes in a Resilient Packet Ring (RPR) network, wherein the RPR is composed of an inner ringlet and an outer ringlet which transmit data in opposite directions, including:

sampling switch commands by a node in the RPR network, and determining whether it is required to switch data paths; if no, continuing to transmit data through a normal data path, and if yes, switching from the normal data path to a WRAP data path when frame boundaries of data transmitted in both the inner ringlet and the outer ringlet are reached.

Preferably, the step of sampling switch commands is implemented during frame intervals of reading inner ringlet data or outer ringlet data.

Preferably, the step of switching from the normal data path to a WRAP data path includes: when data transmission of a whole frame is completed, a switching module stops transmitting data in the former data path, and sets the state of itself as ready for wrapping; and when the switching modules of both inner ringlet and outer ringlet are in the state of ready for wrapping, the node is switched from the normal data path to the WRAP data path.

A method for nodes in a Resilient Packet Ring (RPR) network to exit wrapping protection, wherein the RPR is composed of an inner ringlet and an outer ringlet which transmit data in opposite directions, including:

sampling exit wrapping protection commands by a node in the RPR network, and determining whether to exit wrapping protection state; if no, continuing to transmit data through a WRAP data path, and if yes, recovering from the WRAP data path to a normal data path when frame boundaries of data transmitted in the WRAP data path through switching modules of both the inner ringlet and the outer ringlet are reached.

Preferably, the step of sampling exit wrapping protection commands is implemented during frame intervals of reading data.

Preferably, the step of recovering from the WRAP data path to a normal data path includes: when data transmission of a whole frame is completed, the switching module stops transmitting data in the former data path, and sets the state of itself as ready for exiting wrapping protection; and when the switching modules of both inner ringlet and outer ringlet are in the state of ready for exiting wrapping protection, the node is recovered from the WRAP data path to the normal data path.

A protection switching apparatus for nodes in a Resilient Packet Ring (RPR) network, wherein the RPR is composed of an inner ringlet and an outer ringlet which transmit data in opposite directions, including:

a first switching module, for receiving inner ringlet data and transmitting data to the outer ringlet;

a second switching module, for receiving outer ringlet data and transmitting data to the inner ringlet; and when it is in a normal mode, each of the switching modules transmits the received ringlet data to the other switching module connected to itself and the received ringlet data are transmitted through normal data paths; when wrapping protection is required and frame boundaries of data are reached, the first and second switching modules directly switch data paths within themselves, and transmit the received ringlet data through WRAP data paths.

Preferably, the first or second switching module includes a data transmission submodule and a data reception submodule, respectively; and the data transmission submodule of either of the two switching modules transmits the received ringlet data to the data reception submodule in the same switching module, or to the data reception submodule of the other switching module.

Preferably, the switching module further includes a buffer module used for buffering ringlet data;

the buffer module transmits ringlet data received from the external of the switching module to the data transmission submodule.

Preferably, the first and second switching modules are located in a chip; or separately located in different chips.

The method and apparatus provided in the present invention are suitable for protection switching of Wrapping mode in the RPR protocol, and do not involve complicated handshake signals or interactive protocols, so they are easy to realize. What's more, data path switching is performed at frame boundaries of data transmission, thus no packet will be lost and reliability of RPR network nodes is guaranteed.

EMBODIMENTS OF THE INVENTION

Figure 1:
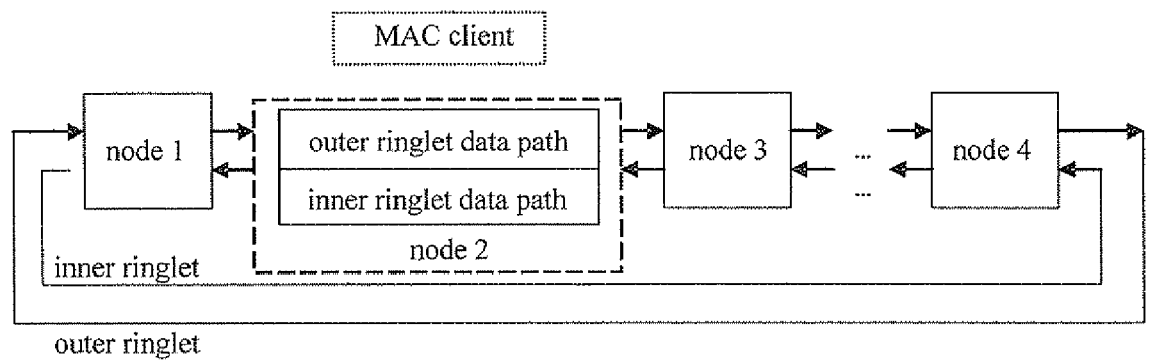
FIG. 1 is a schematic diagram illustrating prior RPR networks and nodes.
Figure 2:
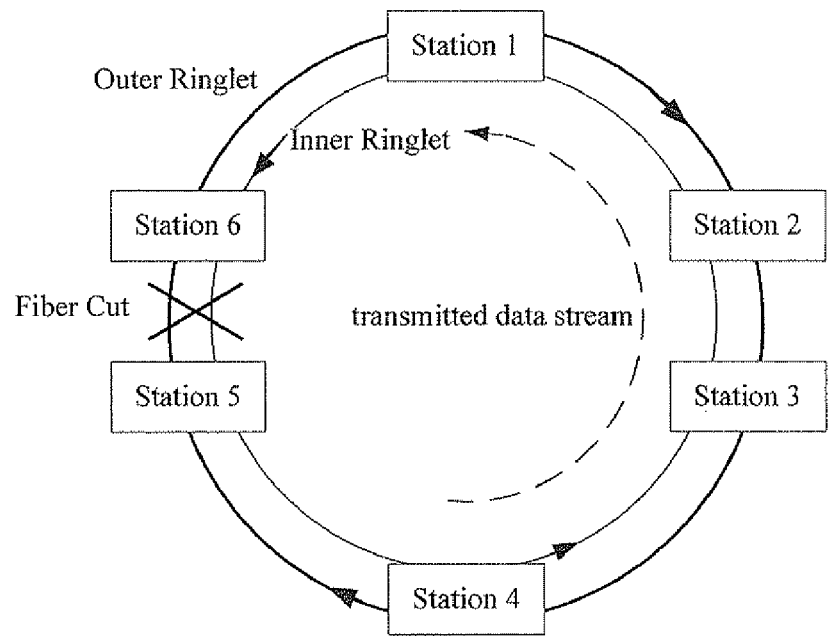
FIG. 2 is a schematic diagram illustrating Steering protection mode.
Figure 3:
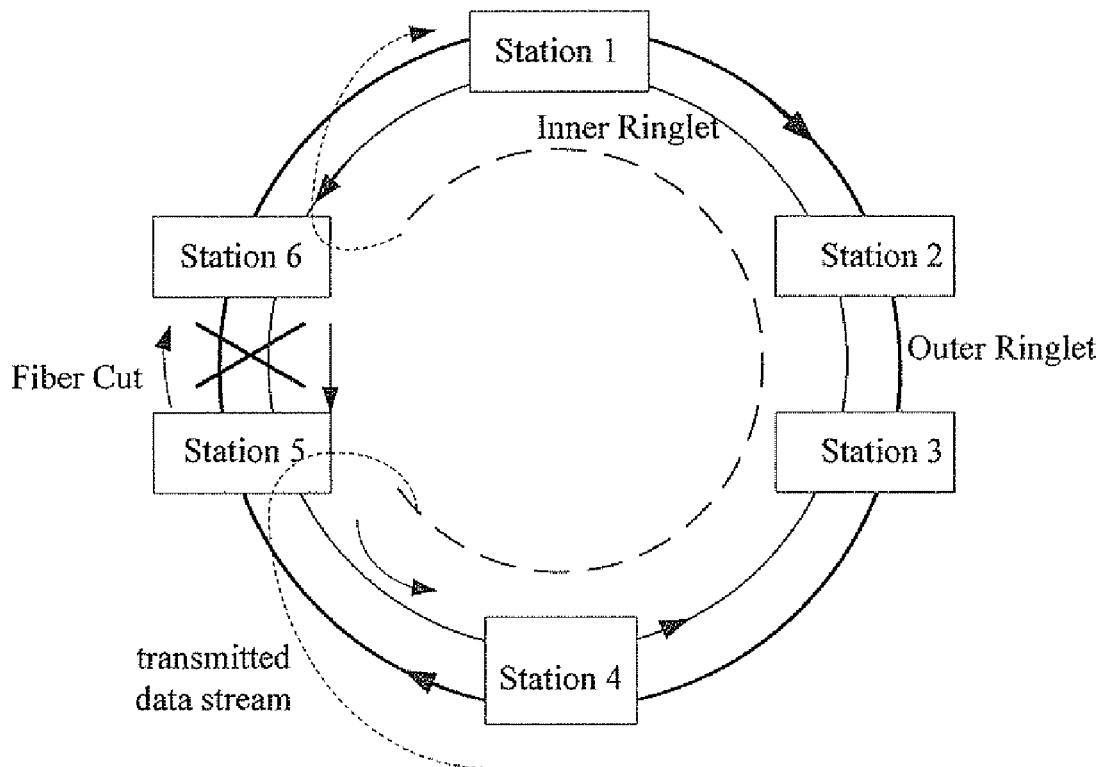
FIG. 3 is a schematic diagram illustrating Wrapping protection mode.
Figure 4:
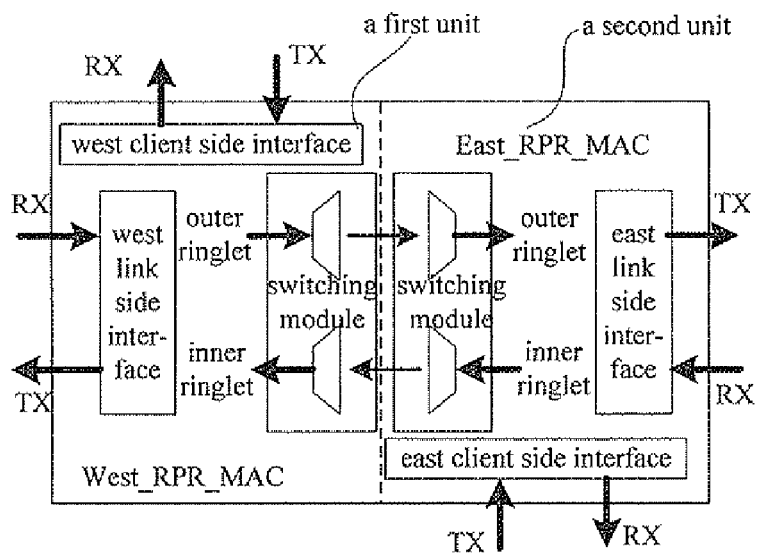
FIG. 4 is a schematic diagram illustrating both structure of an RPR node apparatus and data path in a normal mode according to an embodiment of the present invention.

With reference to FIG. 4, an RPR node thereof symmetrically contains an EAST_RPR_MAC unit and a WEST_RPR_MAC unit, and each unit includes client side interfaces, link side interfaces and a switching module, where the switching module is hereinafter named as PWRAP module, and the PWRAP modules in the WEST_RPR_MAC unit and the EAST_RPR_MAC unit are connected with each other. The EAST_RPR_MAC unit and the WEST_RPR_MAC unit can be located in a chip, or separately located in different chips which are connected, and structures of the EAST_RPR_MAC unit and the WEST_RPR_MAC unit are symmetric.

PWRAP modules in both the WEST_RPR_MAC unit and the EAST_RPR_MAC unit constitute a protection switching apparatus of a node. The PWRAP module has a transmitting direction (hereinafter called TX direction) and a receiving direction (hereinafter called RX direction). When the node is in a normal mode named NORM, the TX direction of PWRAP module in one unit may directly transmit data to the RX direction of PWRAP module in the other unit. When the node is in a wrapping mode named WRAP, the TX direction of PWRAP module may change the data path after transmission of the current frame is finished, and directly transmit subsequent frames to the RX direction of its own.

FIG. 4 is a schematic diagram of a data path of an RPR node in the NORM mode, where outer ringlet data of the RPR network comes into the chip through a west reception interface, i.e., a west link side interface RX or a west client side interface TX, and is sent out of the chip from a east transmission interface, namely a east link side interface TX, via a normal data path of the switching module. In the same way, inner ringlet data of the RPR network comes into the chip through a east reception interface, i.e., a east link side interface RX or a east client side interface TX, and is sent out of the chip from a west transmission interface, namely a west link side interface TX, via a normal data path of the switching module.

Figure 5:
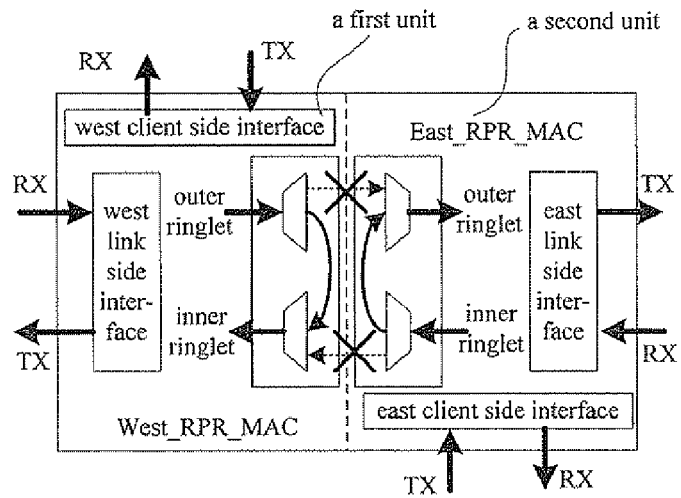
FIG. 5 is a schematic diagram illustrating protection switching for data paths of RPR nodes according to an embodiment of the present invention.

FIG. 5 shows a procedure to implement protection switching for data path of an RPR node. When the node is switched, in order to avoid frame cut or frame error, PWRAP modules in both the WEST_RPR_MAC unit and the EAST_RPR_MAC unit need to exchange information with each other. For instance, when the WEST_RPR_MAC unit receives a switch command and tends to transfer from a normal data path to a WRAP data path (that is, to transfer data from the outer ringlet to the inner ringlet), it should wait until a whole data frame is transmitted to the EAST_RPR_MAC unit, and a whole data frame being transmitted by the EAST_RPR_MAC unit is transmitted as well, namely the WEST_RPR_MAC unit should switch the data path at a frame boundary. In like manner, the EAST_RPR_MAC unit can also transfer data from the inner ringlet to the outer ringlet at a frame boundary according to a switch command. Thus, the protection switching apparatus would transfer from a normal operation mode to a wrapping operation mode, and the RPR network can implement protection switching for fault via the WRAP mode.

When it is required to exit the WRAP mode, the TX direction of PWRAP module will return to the data path of NORM mode after the current frame is transmitted, and directly transmit subsequent frames to the RX direction of PWRAP module in the other unit.

Figure 6:
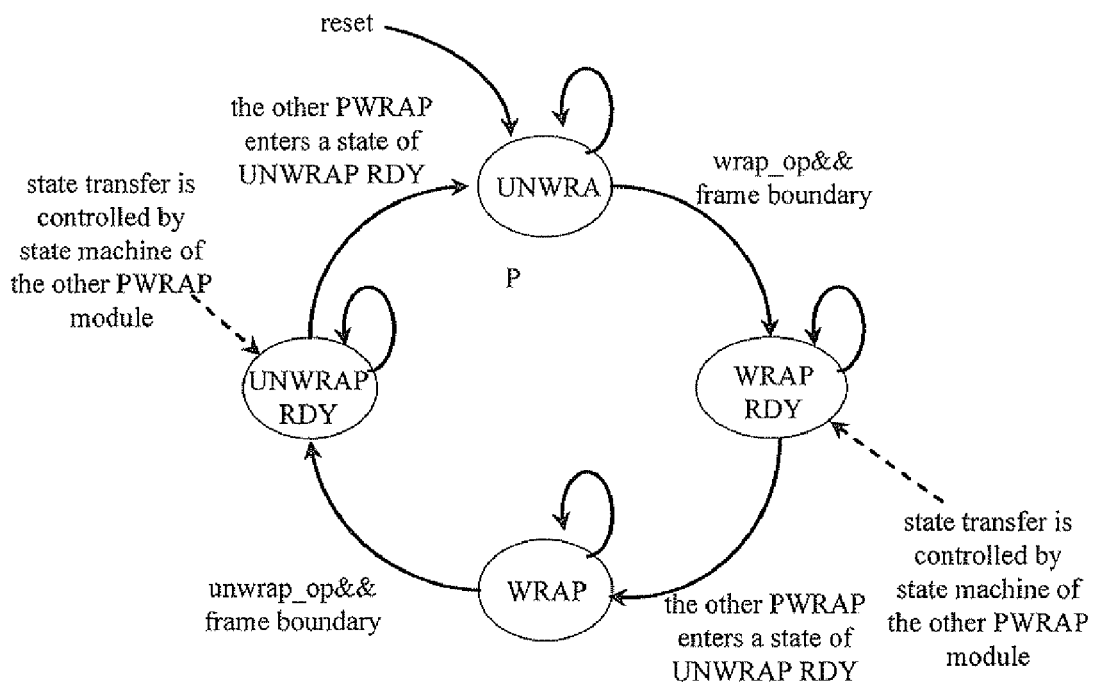
FIG. 6 is a diagram illustrating state transfer of a switching module according to an embodiment of the present invention.

FIG. 6 is a diagram illustrating state transfer of a PWRAP module. State machines of PWRAP modules of the EAST_RPR_MAC unit and the WEST_RPR_MAC unit respectively control data path switching of themselves, and there are handshakes between these two state machines. Both the state machines of PWRAP modules of the east and the west units have 4 states: UNWRAP, WRAP RDY, WRAP and UNWRAP RDY. Here, UNWRAP denotes non-wrapping state, WRAP RDY denotes state of ready for wrapping, WRAP denotes wrapping state and UNWRAP RDY denotes state of ready for non-wrapping. When the chip is powered on and reset, the state machines of PWRAP modules of the east and the west units are both in UNWRAP states. In the UNWRAP state, the TX direction of PWRAP module in one unit directly transmits data to the RX direction of PWRAP module in the other unit. When a switch command indication wrap_op is received, the PWRAP module that first finishes transmitting the current whole data frame enters the WRAP RDY state first, i.e., data path of the TX direction of this PWRAP module is already switched to an RX path on a local side, and the switching is ready. However, it is unknown that when the RX path on the local side can be switched over to receive the TX data of this side in order to bring the PWRAP module into the WRAP state. Here, the state transfer is controlled by state machine of the other PWRAP module. It is until the other PWRAP module also enters the WRAP RDY state that the state transfer would be finished, namely that the TX direction of the other PWRAP module has also finished transmitting the current whole data frame. In this way, either of the PWRAP modules of the east and the west units is in the WRAP state, and the switching from a normal data path to a WRAP data path is completed.

The mechanism of exiting from wrapping state to non-wrapping state is the same as the above. When an exit wrapping protection command unwrap_op is received, the TX direction of PWRAP module enters the UNWRAP RDY state as soon as finishing transmitting the whole data frame to the RX, but the UNWRAP state cannot be restored until the other PWRAP module also enters the UNWRAP RDY state.

Figure 7:
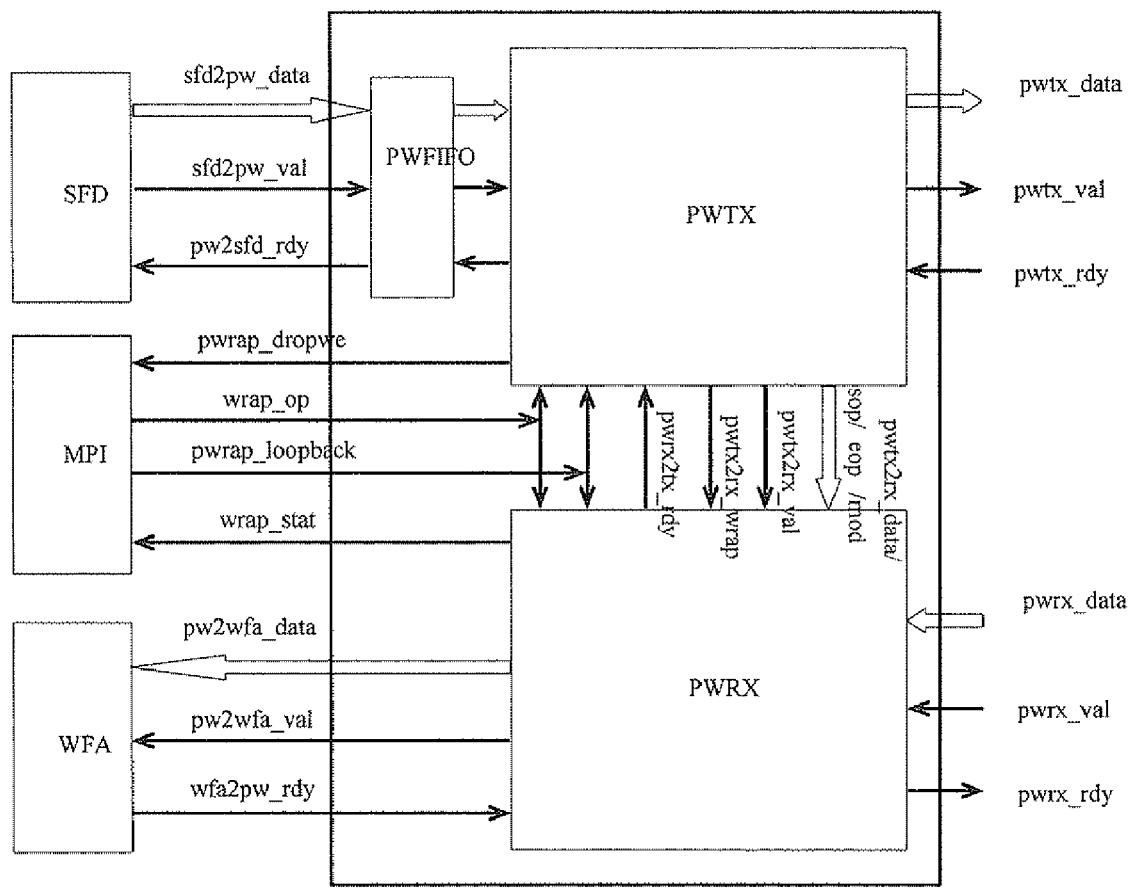
FIG. 7 is a diagram illustrating structure of a switching module according to an embodiment of the present invention.

FIG. 7 shows structure of a PWRAP module. PWRAP modules of the WEST_RPR_MAC unit and the EAST_RPR_MAC unit are symmetric, and FIG. 7 is a diagram illustrating structure of PWRAP module of the west unit. However, symmetric structure of PWRAP module of the east unit can be easily deduced from this diagram by those skilled in the art. Therefore, only structure of the west PWRAP module is illustrated hereinafter. The PWRAP module in the figure is composed of a data transmission submodule PWTX, a data reception submodule PWRX and a buffer module PWFIFO. The PWTX submodule is responsible for receiving data transmitted by a Schedule Forward Dispatcher (SFD); the buffer module PWFIFO is located between the SFD module and the PWTX submodule, and used for buffering and forwarding transmitted data between them; the PWRX submodule functions to transmit data to a Weighted Fairness Algorithm (WFA) module; the PWTX submodule and the PWRX submodule together receive control signals sent by a Micro Processor Interface (MPI) module, and return state signals back to the MPI module. Here, the above-mentioned SFD, WFA and MPI are all modules of MAC layer within nodes.

The PWRAP modules of the WEST_RPR_MAC unit and the EAST_RPR_MAC unit are connected with each other, and the specific structure is: the data transmission submodule PWTX in the WEST_RPR_MAC unit and the data reception submodule PWRX in the EAST_RPR_MAC unit are connected, while the data transmission submodule PWTX in the EAST_RPR_MAC unit and the data reception submodule PWRX in the WEST_RPR_MAC unit are connected.

Figure 8:
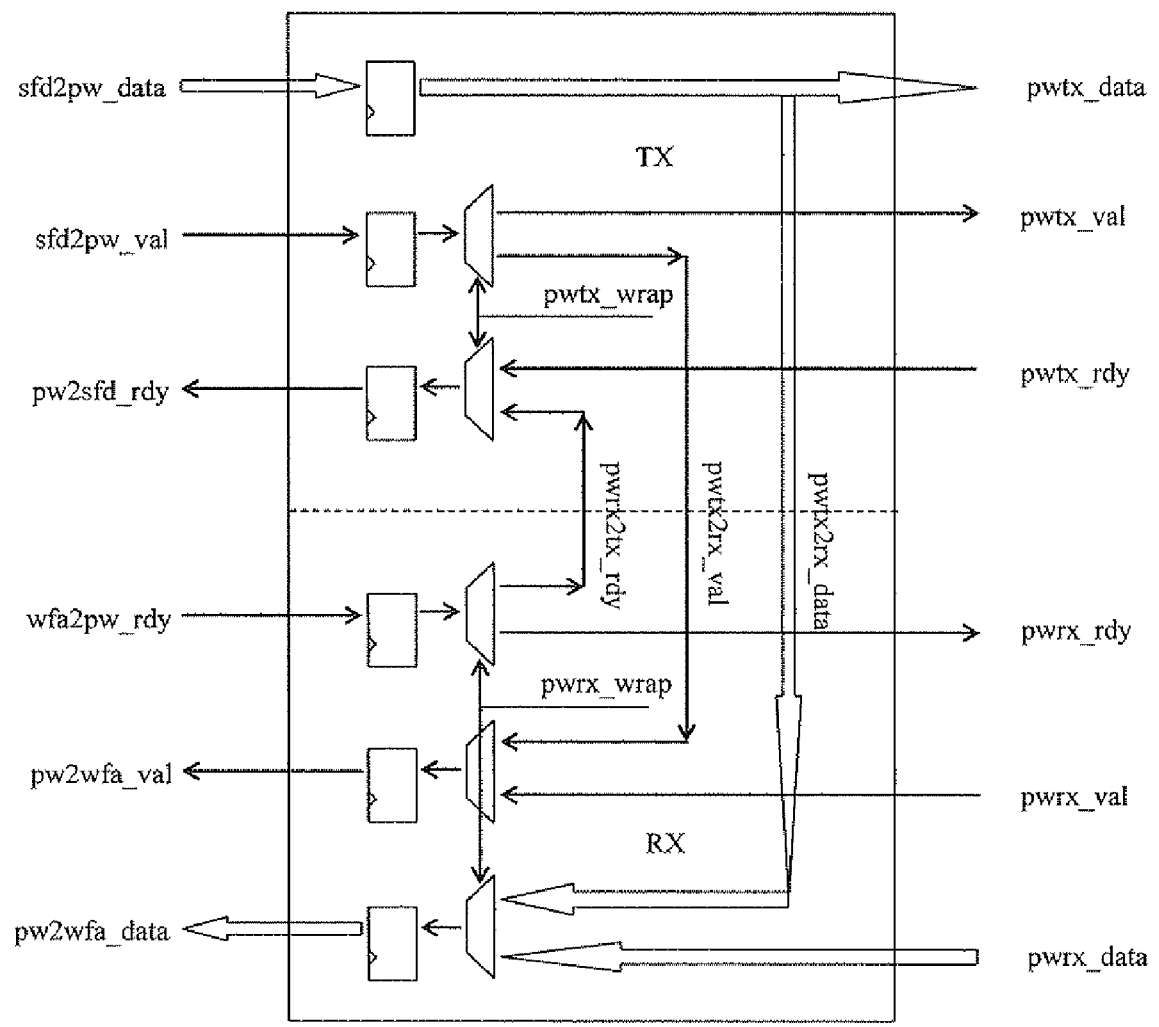
FIG. 8 is a schematic diagram illustrating logic structure of a switching module to implement switch control according to an embodiment of the present invention.

FIG. 8 is a schematic diagram illustrating logic structure of a PWRAP module to implement switch control. Signals in FIG. 7 and FIG. 8 are illustrated as follows:

sfd2pw_val is a data effective indication signal sent from the SFD module to the PWRAP module. Accordingly, sfd2pw_data denotes data transmitted by the SFD module to the PWRAP module, while pw2sfd_rdy is a transmission allowable indication signal sent from the PWRAP module to the SFD module;

pwtx_val is a data effective indication signal output to the other PWRAP module by the PWTX submodule of one PWRAP module. Accordingly, pwtx_data denotes data transmitted by one PWTX submodule to the other PWRAP module, while pwtx_rdy is a transmission allowable indication signal sent to the present PWTX submodule by the other PWRAP module;

pw2wfa_val is a data effective indication signal sent by the PWRX submodule to the WFA module. Accordingly, pw2wfa_ data denotes data transmitted by the PWRX submodule to the WFA module, while wfa2pw_rdy is a transmission allowable indication signal sent by the WFA module to the PWRX submodule;

pwrx_val is a data effective indication signal output to one PWRX submodule by the other PWRAP module. Accordingly, pwrx_data denotes data transmitted to one PWRX submodule by the other PWRAP module, while pwrx_rdy is a transmission allowable indication signal output by one PWRX submodule to the other PWRAP module;

pwtx2rx_val is a data effective indication signal output by the PWTX submodule to the PWRX submodule. Accordingly, pwtx2rx_data denotes data transmitted from the PWTX submodule to the PWRX submodule, while pwtx2rx_rdy is a transmission allowable indication signal output by the PWRX submodule to the PWRX submodule;

wrap_op is a switch command indication signal sent to both the PWTX submodule and the PWRX submodule by the MPI module. The pwtx_wrap and pwrx_wrap signals are switch state indication signals of the PWTX submodule and the PWRX submodule, which are decided according to the wrap_op signal and the transfer state of the current frame. In other words, the pwtx_wrap signal is effective only when the wrap_op signal is effective and the transmission of current frame in the TX direction is finished, while the pwrx_wrap signal is effective only when the wrap_op signal is effective and the transmission of current frame in the RX direction is finished.

The PWRAP module can switch from a normal data path in the transmitting direction to a WRAP data path. Because data path switching is based on frames, the switch command indication named wrap_op must be sampled during frame intervals of reading data, and the frame intervals thereof can be determined according to toggles of frame tail indication signals. Since switching is performed by cooperation of the TX direction and the RX direction, switch state indication signals named pwtx_wrap and pwrx_wrap are key path control switches.

Figure 9:
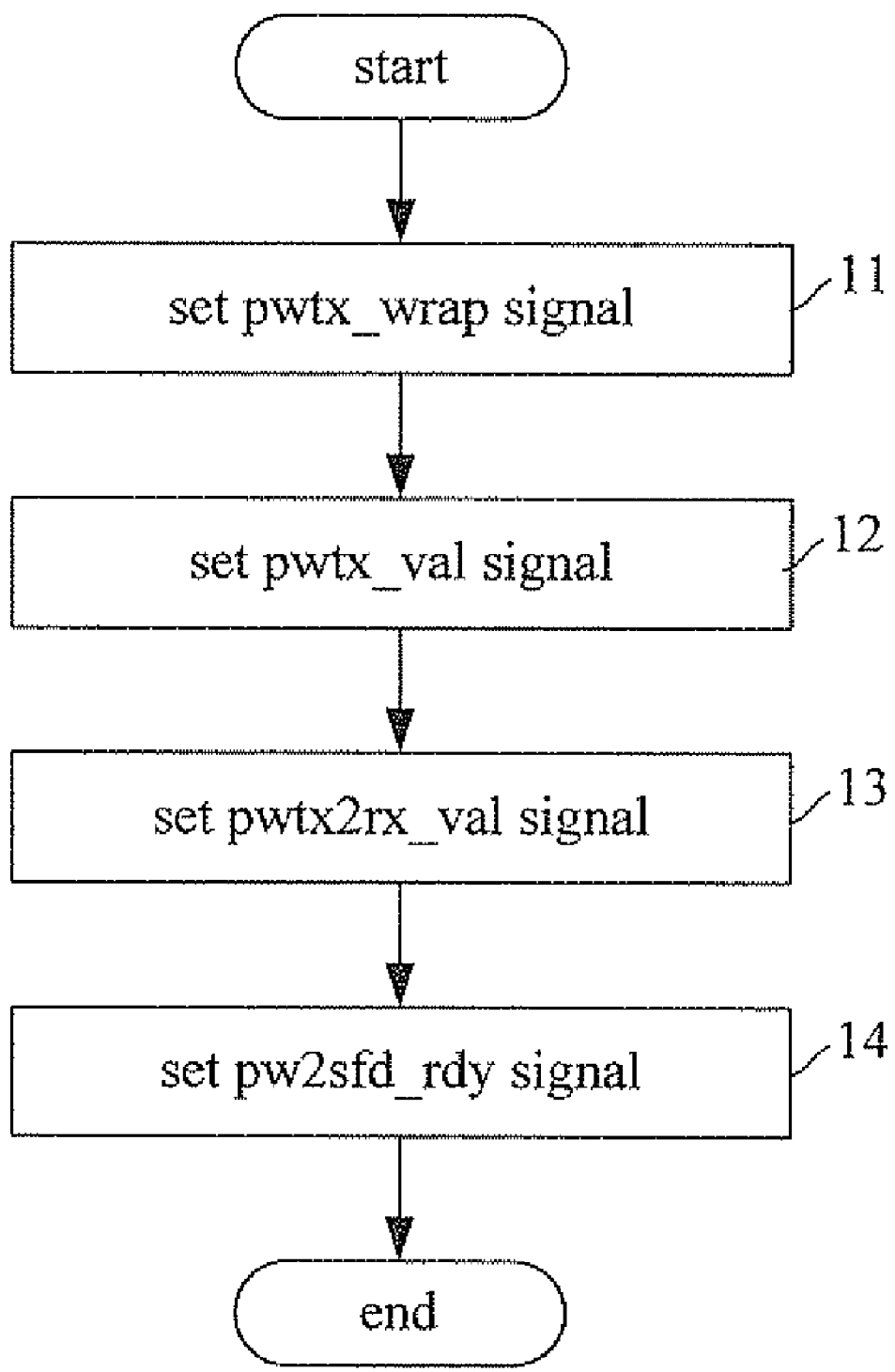
FIG. 9 shows a switch control process in the transmitting direction according to an embodiment of the present invention.

FIG. 9 shows a general control procedure of data path switching in the TX direction of PWRAP module.

Firstly, set the pwtx_wrap signal in step 11. Specifically speaking (not shown in the figure), decide whether the data transmitted by one PWTX submodule to the other PWRAP module is in a frame interval, if yes, sample the wrap_op signal, and set the pwtx_wrap signal according to the sampled value of the wrap_op signal.

Secondly, set the pwtx_val signal in step 12. Specifically speaking (not shown in the figure), decide whether the pwtx_wrap signal is effective, if yes, it means that protection switching is needed, thus set the pwtx_val signal as ineffective to stop transmitting data from one PWTX submodule to the other PWRAP module, otherwise, set the pwtx_val signal as effective and transmit data from the PWFIFO submodule of one unit to the PWRAP module of the other unit.

Thirdly, set the pwtx2rx_val signal in step 13. Specifically speaking (not shown in the figure), continue to decide whether the pwtx_wrap signal is effective, if it isn't, set the pwtx2rx_val signal as ineffective to stop transmitting data from the PWTX submodule to the PWRX submodule, otherwise, set the pwtx2rx_val signal as effective and transmit data from the PWFIFO submodule of a unit to the PWRX module of the same unit.

Lastly, set the pw2sfd_rdy signal in step 14. Specifically speaking (not shown in the figure), decide whether the pwtx_wrap signal is effective, if it isn't, set the pw2sfd_rdy signal as pwtx_rdy signal, that is, set the pw2sfd_rdy signal as ready signal of normal data path, otherwise, set the pw2sfd_rdy signal as pwrx2tx_rdy signal which is a ready signal of WRAP data path.

By utilizing the above-mentioned signals, it can be controlled whether the TX data path of a local side is switched to the RX path of the same side, or to the PWRAP module on the other side. Supposing that the TX data path on a local side is switched to the RX path on the same side, it should be judged whether the PWRAP module on the other side is transmitting data to the RX path of the local side, if yes, the path cannot be switched until data transmission on the other side is in a frame interval. In addition, state when the RX path on a local side is switched over to receive the TX data on the local side is controlled by the pwrx_wrap signal.

Figure 10:
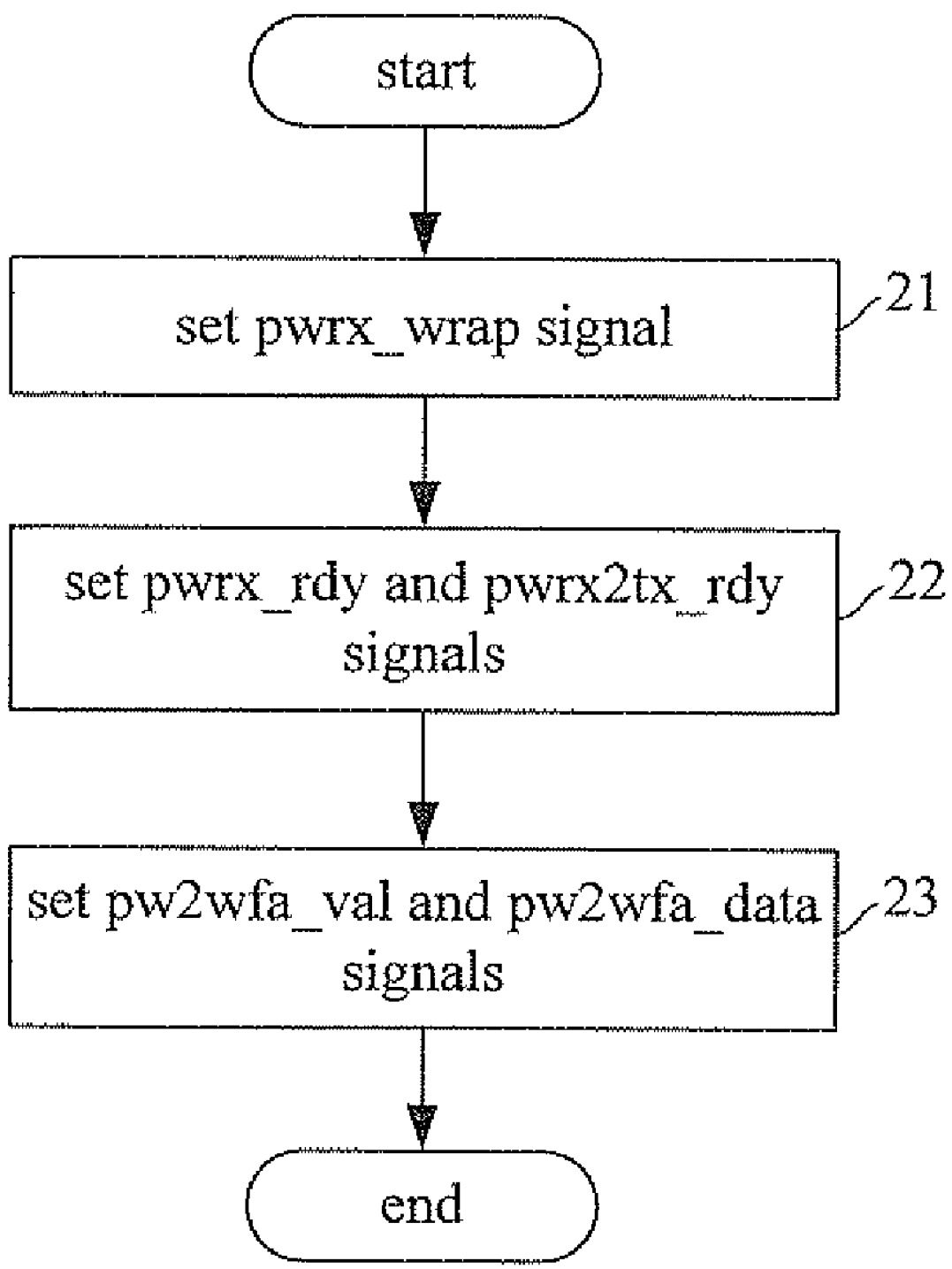
FIG. 10 shows a switch control process in the receiving direction according to an embodiment of the present invention.

FIG. 10 shows a general procedure of controlling WRAP switch in the RX direction.

Firstly, set the pwrx_wrap signal in step 21. Specifically speaking (not shown in the figure), decide whether data transmitted to the PWRX submodule of a unit by the PWTX submodule of the other unit is in a frame interval, and whether the wrap_op signal is effective, if both results are yes, set the pwrx_wrap signal as effective, otherwise, if the pwrx_wrap signal and the wrap_op signal is both ineffective, set the pwrx_wrap signal as ineffective.

Secondly, set the pwrx_rdy signal and the pwrx2tx_rdy signal in step 22. Specifically speaking (not shown in the figure), if the pwrx_wrap signal is effective, set the pwrx_rdy signal as ineffective to stop the other PWRAP module from transmitting data to the present PWRX submodule, set the pwrx2tx_rdy signal as wfa2pw_rdy to receive data from the other PWRAP module, and set the pwrx2tx_rdy signal as ineffective to terminate receiving data transmitted from the present PWTX submodule.

And then, set the pw2wfa_val signal and the pw2wfa_data signal in step 23. Specifically speaking (not shown in the figure), if the pwrx_wrap signal is effective, set the pw2wfa_val signal as pwtx2rx_val to indicate receiving information from a WRAP data path, and set the pw2wfa_data signal as pwtx2rx_data to indicate receiving information from a normal data path, and set the pw2wfa_data signal as pwrx_data to indicate receiving data from a normal data path.

In this way, it can be controlled whether the RX data path of a local side is to receive data from the TX path of the same side, or to receive data from a PWRAP module of the other side by the above-mentioned signals.

By utilizing signal controls discussed in FIG. 9 and FIG. 10, the switching module can change from/to a NORM data path to/from a WRAP data path.

To be specified in addition, although a chip is utilized to delineate the present embodiment, those skilled in the art can understand based on the embodiment that this technical scheme is not confined to implement nondestructive switching in a single chip, and it can also be applied to implement nondestructive switching in two connected chips.

According to the above description, by applying RPR protocol of public technology, those skilled in the art can acquire all necessary information of the embodiments of the present invention without extra explanation, so as to implement simple and reliable data path switching for nodes in an RPR network.

The above-mentioned embodiments are not intended to limit the present invention, and those skilled in the art can design various devices according to the above description. Consequently, technical schemes without departing from principles of this invention should be covered within the scope of the present invention.

The invention claimed is:

1. A protection switching method for nodes in a Resilient Packet Ring (RPR) network, wherein said RPR is composed of an inner ringlet and an outer ringlet which transmit data in opposite directions, comprising:

sampling switch commands by a node in the RPR network, and determining whether it is required to switch data paths; if no, continuing to transmit data through a normal data path, and if yes, switching from the normal data path to a WRAP data path when frame boundaries of data transmitted in both the inner ringlet and the outer ringlet are reached, wherein, the step of switching from the normal data path to a WRAP data path comprises: setting the state of the switching modules of both the inner ringlet and the ring outer ringlet as ready for wrapping; and switching said node from the normal data path to the WRAP data path.

2. The method according to claim 1, wherein the step of sampling switch commands is implemented during frame intervals of reading inner ringlet data or outer ringlet data.

3. A method for nodes in a Resilient Packet Ring (RPR) network to exit wrapping protection, wherein said RPR is composed of an inner ringlet and an outer ringlet which transmit data in opposite directions, comprising:

sampling exit wrapping protection commands by a node in the RPR network, and determining whether to exit wrapping protection state; if no, continuing to transmit data through a WRAP data path, and if yes, recovering from the WRAP data path to a normal data path when frame boundaries of data transmitted in the WRAP data path through switching modules of both the inner ringlet and the outer ringlet are reached wherein, the step of recovering from the WRAP data path to a normal data path comprises: setting the state of the switching modules of both the inner ringlet and the outer ringlet for exiting wrapping protection, recovering said node from the WRAP data path to the normal data path.

4. The method according to claim 3, wherein the step of sampling exit wrapping protection commands is implemented during frame intervals of reading data.

5. A protection switching apparatus for nodes in a Resilient Packet Ring (RPR) network, wherein said RPR is composed of an inner ringlet and an outer ringlet which transmit data in opposite directions, comprising:
    a first switching module configured to receive inner ringlet data or send data to the outer ringlet;
    a second switching module configured to receive outer ringlet data or send data to the inner ringlet; and
    when it is in a normal mode, each of the switching modules transmits the received ringlet data to the other switching module connected to itself, and the received ringlet data are transmitted through normal data paths; when wrapping protection is required and frame boundaries of data are reached, said first and second switching modules directly switch data paths within themselves, and transmit the received ringlet data through WRAP data paths.

6. The protection switching apparatus according to claim 5, wherein said first or second switching module comprises a data transmission submodule and a data reception submodule, respectively; and
    the data transmission submodule of either of the two switching modules transmits the received ringlet data to the data reception submodule in the same switching module, or to the data reception submodule of the other switching module.

7. The protection switching apparatus according to claim 6, wherein a first data effective indication signal is transmitted from the data transmission submodule of the first switching module to the data reception submodule of the second switching module;
    a first transmission allowable indication signal is transmitted from the data reception submodule of the second switching module to the data transmission submodule of the first switching module; and
    first ringlet data are transmitted from the data transmission submodule of the first switching module to the data reception submodule of the second switching module.

8. The protection switching apparatus according to claim 6, wherein a second data effective indication signal is transmitted from the data transmission submodule of the second switching module to the data reception submodule of the first switching module;
    a second transmission allowable indication signal is transmitted from the data reception submodule of the first switching module to the data transmission submodule of the second switching module; and
    second ringlet data are transmitted from the data transmission submodule of the second switching module to the data reception submodule of the first switching module.

9. The protection switching apparatus according to claim 6, wherein a third data effective indication signal is transmitted from the data transmission submodule of a third switching module to the data reception submodule of the third switching module;
    a third transmission allowable indication signal is transmitted from the data reception submodule of the third switching module to the data transmission submodule of the third switching module; and
    third ringlet data are transmitted from the data transmission submodule of the third switching module to the data reception submodule of the third switching module;
    wherein the third switching module is one of the first and second switching modules.

10. The protection switching apparatus according to claim 6, wherein said switching module further comprises a buffer module used for buffering ringlet data;
    said buffer module transmits ringlet data received from the external to the data transmission submodule.

11. The protection switching apparatus according to claim 5, wherein said first and second switching modules are located in a chip; or separately located in different chips.

12. A data switching method, applied in a data transmission system, the data transmission system includes a plurality of nodes, wherein the plurality of nodes are connected to form a first data transmission channel and a second data transmission channel which transmit data frames in opposite directions, the method comprising:
    receiving, at any one of the plurality of nodes, a data switch command when the node is receiving a first data frame or sending a second data frame;
    when one of the two conditions is met, the node entering a state of ready for wrapping, the two conditions are the first data frame is completely received by the node and the second data frame is completely sent by the node;
    when the other of the two conditions is met as well, the node changing to a wrapping protection state; and
    sending the data frames received at the node from the first data transmission channel out of the node from the second data transmission channel, and sending the data frames received at the node from the second data transmission channel out of the node from the first data transmission channel.

13. The method according to claim 12, further comprising: sampling the data switch command, and determining whether any of the two conditions is met.

14. The method according to claim 13, wherein sampling the data switch command is implemented during frame intervals.

* * * * *